(12) United States Patent
Ishikawa

(10) Patent No.: US 6,478,367 B2
(45) Date of Patent: Nov. 12, 2002

(54) VEHICLE BODY REINFORCEMENT STRUCTURE

(75) Inventor: Masahiro Ishikawa, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/755,481

(22) Filed: Jan. 5, 2001

(65) Prior Publication Data

US 2001/0020794 A1 Sep. 13, 2001

(30) Foreign Application Priority Data

Jan. 7, 2000 (JP) .......................................... 2000-001937

(51) Int. Cl.⁷ .......................... B62D 27/00; B62D 27/02
(52) U.S. Cl. .................. 296/203.03; 296/199; 296/29
(58) Field of Search ................................. 296/187, 188, 296/203.01, 203.03, 29

(56) References Cited

U.S. PATENT DOCUMENTS

| | | | | |
|---|---|---|---|---|
| 1,602,913 A | * | 10/1926 | Leipert | ........................ 296/29 |
| 4,938,525 A | * | 7/1990 | Yamauchi | .................... 296/188 |
| 6,073,992 A | * | 6/2000 | Yamauchi et al. | ..... 296/203.01 |
| 6,322,135 B1 | * | 11/2001 | Okana et al. | .......... 396/203.03 |
| 6,328,376 B2 | * | 12/2001 | Son | ....................... 296/203.03 |

FOREIGN PATENT DOCUMENTS

| | | | | |
|---|---|---|---|---|
| JP | 58-185376 | * | 10/1983 | ............. 296/203.03 |
| JP | 3-32990 | * | 2/1991 | ............. 296/203.03 |
| JP | 6-107238 | * | 4/1994 | ................. 296/188 |
| JP | 10-53156 | | 2/1998 | |

* cited by examiner

Primary Examiner—Joseph D. Pape
Assistant Examiner—Hilary Gutman

(57) ABSTRACT

A vehicle body reinforcement structure includes a first reinforcement material (21) of hard resin disposed in a center pillar (17), a second reinforcement material (23) of hard resin disposed in a roof side portion (18) and a joint portion (26) formed on the first and second reinforcement materials (21), (23).

7 Claims, 10 Drawing Sheets

VEHICLE BODY REINFORCEMENT STRUCTURE

BACKGROUND OF THE INVENTION

1. Field of the Invention

The present invention relates to a vehicle body reinforcement structure desirable for improving the rigidity at a connecting portion between closed section structures without welded joints.

2. Description of the Related Art

Since a connecting portion on a vehicle body such as a connecting portion between a roof side portion and a center pillar largely contributes to improving the vehicle body rigidity, the rigidity at the connecting portion is improved by reinforcing the connecting portion.

An example of the reinforcement of a connecting portion on the vehicle body as described above will be explained with reference to FIGS. 11A and 11B.

FIGS. 11A and 11B are perspective views showing how a conventional reinforcement of a connecting portion on the vehicle body is carried out.

FIG. 11A shows a state in which a pillar side reinforcement plate 104 is placed on a roof side reinforcement plate 103 in such a manner as to form a T-shape and is welded thereon for fixation in the interior of a connecting portion 102 between a roof side portion 100, which is a closed section structure, and a center pillar 101, which is also a closed section structure.

FIG. 11B is a sectional view taken along the line XI—XI in FIG. 11A, in which reference numeral 105 denotes an outer panel; 106: an inner panel; 107: a roof side rail; and 108: a roof panel.

In the related art described above, the rigidity at the connecting portion 102 between the roof side portion 100 and the center pillar 101 is improved by assembling and welding the roof side reinforcement plate 103 and the pillar side reinforcement plate 104 together in a T-shaped fashion. In this case, three members such as the inner panel 106, the roof side reinforcement panel 103 and the roof side rail 107 have to be assembled and welded together, and four members such as the roof side rail 107, the roof side reinforcement plate 103, the outer panel 105 and the roof panel 108 have to be assembled and welded together. This makes welding difficult, and reduces the working efficiency and deteriorates the productivity.

In addition, for example, in the event that an external force F is applied to the center pillar 101 from the side, a torsion moment M designated by an arrow acts on the roof side portion 100 with the center pillar 101 acting as an arm.

Although the twisting of the roof side portion 100 is reduced by causing the roof side portion 100 itself and the roof side reinforcement plate 103 to bear the torsion moment M, in order to further improve the vehicle crash safety, steering stability and quietness, it is desired that the torsional rigidity at the roof side portion 100 which constitutes the connecting portion 102 be improved further so as to improve in turn the body rigidity as high as possible.

Additionally, for example, the description in JP-A-1053156 entitled "Interruption, Reinforcement Structure of Hollow Structures, and Interruption, Reinforcement Method" is known as the reinforcement structure for closed section structures as shown in FIGS. 12A and 12B.

In FIGS. 12A and 12B, a pillar 201 is described in which a synthetic resin reinforcement member 210 including a plurality of reinforcement plates 211 which are connected to each other by connecting pieces 212, 213 is inserted in a hollow chamber 206 formed between an inner panel 202 and an outer panel 204, and a foamable base material 221 is inserted between the reinforcement plates 211, 211.

In a case where the technique described in this publication is applied to a connecting portion between closed section structures, or, in a case where the technique is used to connect the reinforcement members 210, since the reinforcement member 210 itself is constituted by the plurality of reinforcement plates 211 and the connecting pieces 212, 213, the configuration thereof is very complicated, and therefore it is difficult to form a connecting portion on this reinforcement member 210.

SUMMARY OF THE INVENTION

To cope with this, an object of the invention is to provide a vehicle body reinforcement structure which can improve the working efficiency by eliminating welded portions, facilitate the formation of a joint portion and improve the rigidity at a connecting portion where closed section, structures are connected to each other.

With a view to attaining the object, according to a first aspect of the invention, there is provided a vehicle body reinforcement structure for reinforcing a connecting portion where closed section structures such aspillars, roof side portions or the like are connected to each other, the reinforcement structure comprising a first reinforcement material of hard resin disposed in one of the closed section structures, a second reinforcement material of hard resin disposed in the other closed section structure, and a joint portion formed on the first and second reinforcement materials for direct jointing the first and second reinforcement materials.

Welded portions used where reinforcement is effected using sheet steel are eliminated by jointing the first hard resin reinforcement material and the second hard resin reinforcement material which is the same as the first one together at the joint portions. This can improve the working efficiency in reinforcing the connecting portion where the closed section structures are connected together.

In addition, since the first reinforcement material of hard resin is disposed in one of the closed section structures, the second reinforcement material of hard resin is disposed in the other closed section structure, and the joint portion is formed on the first and second reinforcement materials for direct jointing the first and second reinforcement materials, the connecting portion of the closed section structures and the closed section structures themselves become solid, thus increasing the torsional rigidity.

Consequently, the vehicle body rigidity can effectively be improved by improving the rigidity of the connecting portion of the closed section structures which best contributes to the improvement of the vehicle body rigidity.

According to a second aspect of the invention, the joint portion comprises a raised portion formed on the first reinforcement material and a recessed portion formed in the second reinforcement material.

The construction of the joint portion is made simple by constituting the joint portion by the raised portion on the first reinforcement material and the recessed portion in the second reinforcement material. This facilitates the production of the first and second reinforcement materials and hence reduces the production cost thereof.

According to a third aspect of the invention, the joint portion each comprises a plurality of ribs with a foamable resin inserted between the ribs which are adjacent to each other.

The resin inserted in the joint portions expands to fill the space within the connecting portion of the closed section structures. This allows the first and second reinforcement materials to be jointed together strongly to thereby improve the rigidity thereat, the rigidity of the vehicle body being thus improved.

DETAILED DESCRIPTION OF THE PREFERRED EMBODIMENTS

Figure 1:
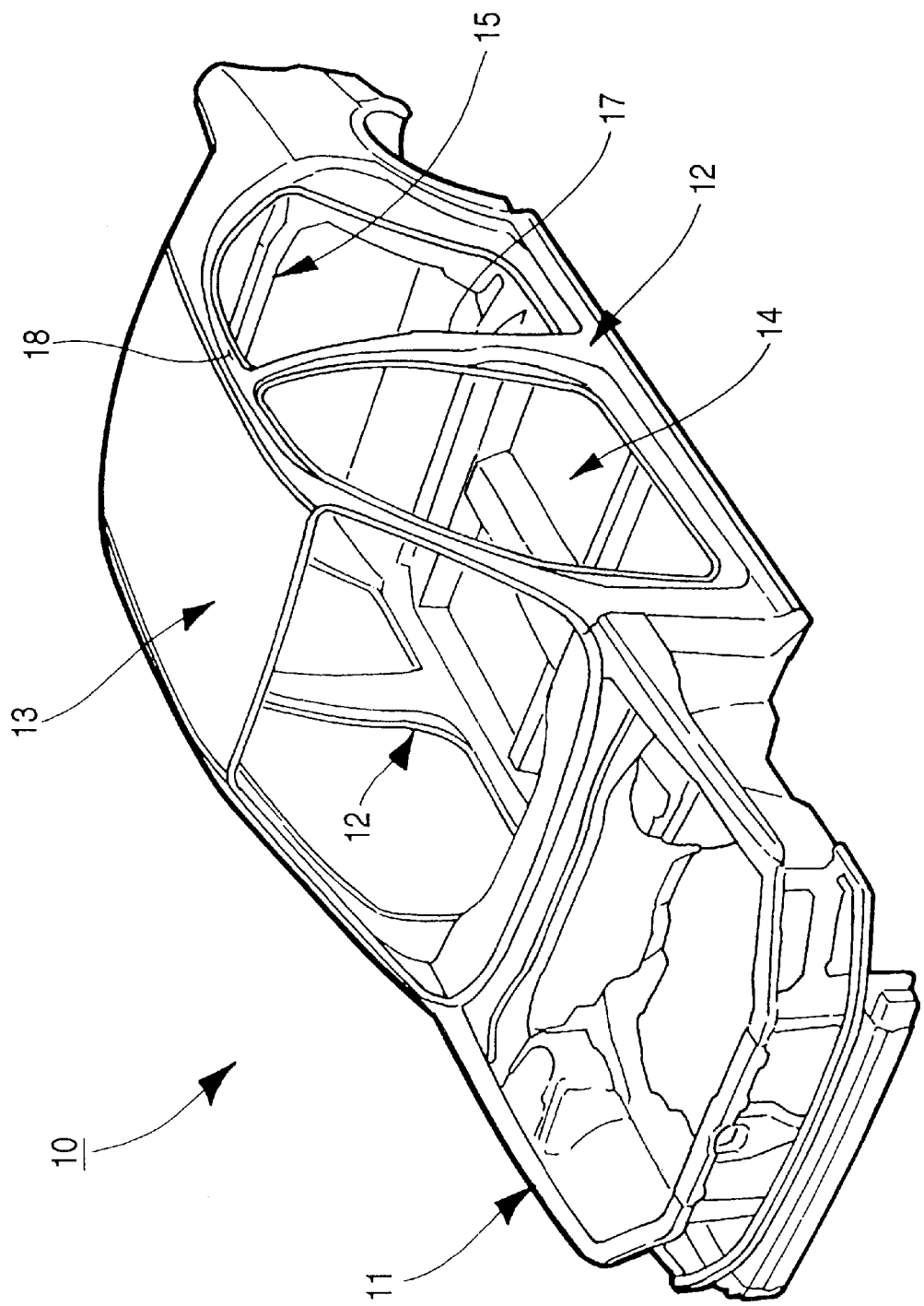
FIG. 1 is a perspective view of a body adopting a vehicle body reinforcement structure (a first embodiment) of the invention.

Embodiments of the invention will be described below with reference to the accompanying drawings. Note that the drawings are to be viewed in directions in which reference numerals are oriented.

FIG. 1 is a perspective view showing a vehicle body adopting a vehicle body reinforcement structure (a first embodiment) according to the invention. A body. 10, which is a vehicle body, includes a front body 11 supporting an engine and the like, side bodies 12, 12 extending rearward from ends of the front body to constitute sides of a passenger compartment of a vehicle, a roof 13 connecting upper portions of the respective side bodies 12, 12 so as to constitute a ceiling of the passenger compartment, an under body 14 connecting lower portions of the side bodies 12, 12 so as to constitute a floor of the passenger compartment and a rear body 15 disposed rearward of the under body 14 and between the side bodies 12, 12.

The side body includes a roof side portion 18 contiguous with a center pillar 17 and the roof 13.

Figure 2:
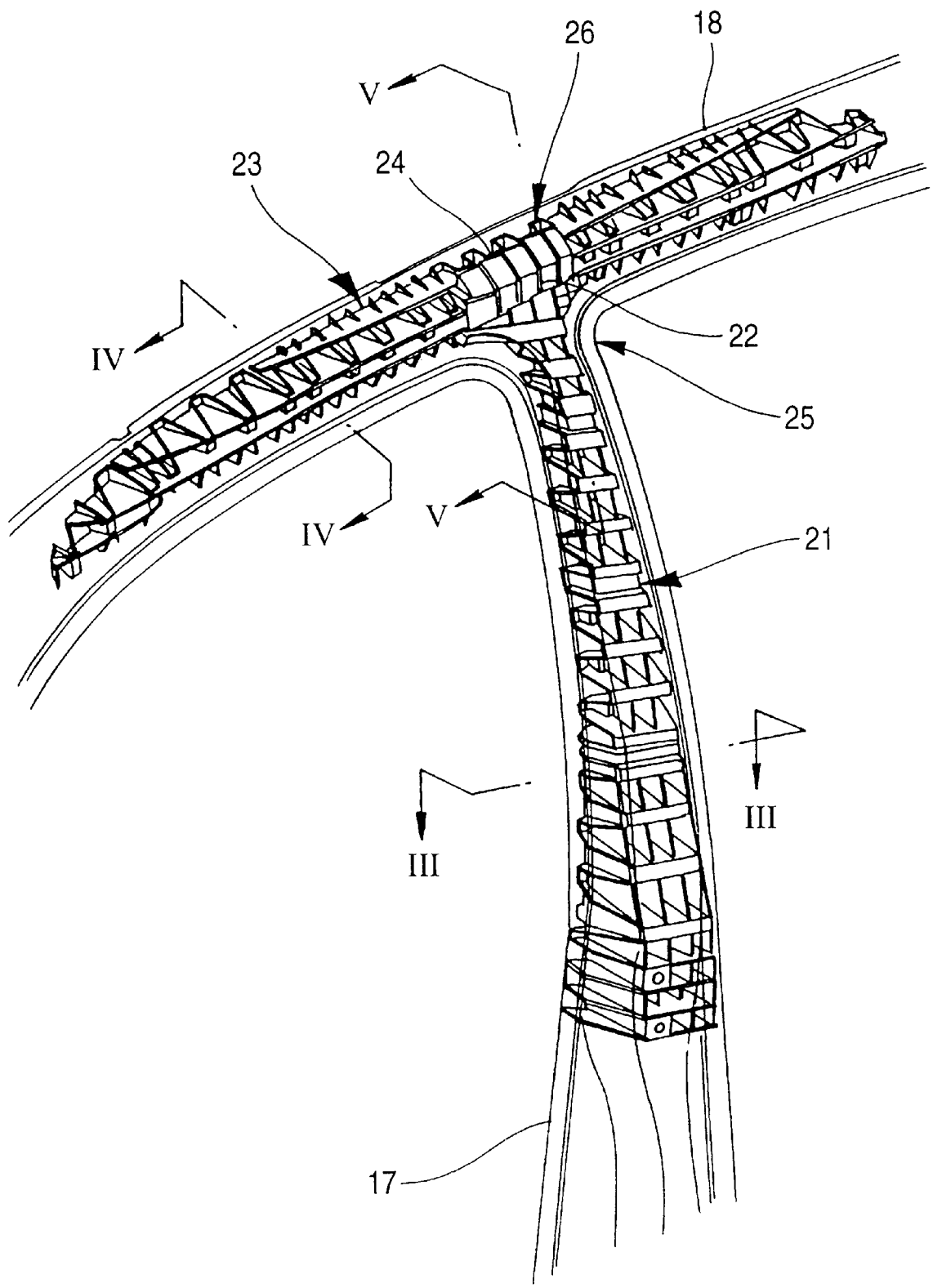
FIG. 2 is a perspective view showing a main part of the body adopting the vehicle body reinforcement structure (the first embodiment) of the invention.

FIG. 2 is a perspective view showing a main part of the body adopting the vehicle body reinforcement structure (the first embodiment) according to the invention and more particularly a perspective view showing a connecting portion where the center pillar 17 and the roof side portion 18 are connected together.

The center pillar 17 has a first reinforcement material 21 of hard resin disposed at an upper portion in the interior thereof, and the first reinforcement material 21 has a pillar side joint portion 22 formed at an upper end portion thereof.

The roof side portion 18 has a second reinforcement material 23 of hard resin disposed in the interior thereof, and the second reinforcement material 23 has a roof side joint portion 24 formed at a central portion thereof.

A joint portion 26 made up of the pillar side joint portion 22 and the roof side joint portion 24 is disposed in a connecting portion 25 of the center pillar 17 and the roof side portion 18.

The first and second reinforcement materials 21, 23 are members which are each formed of a resin into an integral body having a construction in which a plurality of ribs are interlaced vertically and horizontally so as to reduce the weight, while increasing the rigidity of the material.

Figure 3:
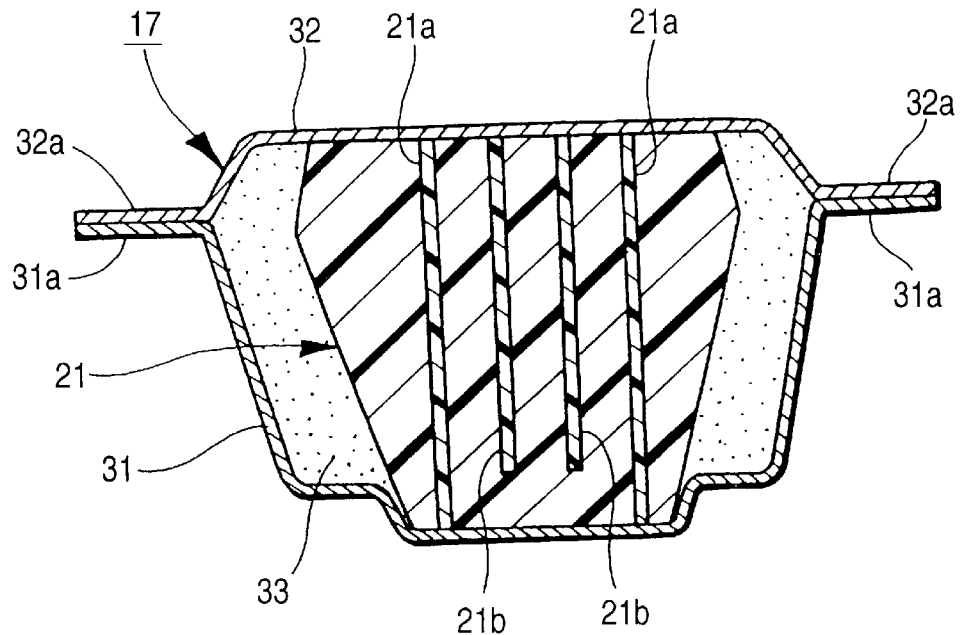
FIG. 3 is a cross-sectional view taken along the line III—III in FIG. 2.

FIG. 3 is a cross-sectional view taken along the line III—III in FIG. 2. The center pillar 17 is a closed section structure including an outer panel 31 and an inner panel 32 which is attached to the inside of the outer panel 31, in which the first reinforcement material 21 is interposed between the outer panel 31 and the inner panel 32 and a filler 33 is filled in a space between the outer panel 31 and the inner panel 32. Additionally, reference numerals 31$a$, 31$a$ denote flanges of the outer panel 31, and reference numerals 32$a$, 32$a$ denote flanges of the inner panel 32 which are welded, respectively, to the flanges 31$a$, 31$a$.

The first reinforcement material 21 has ribs 21$a$ . . . (hereinafter, . . . denotes plurality) and ribs 21$b$ . . .

Figure 4:
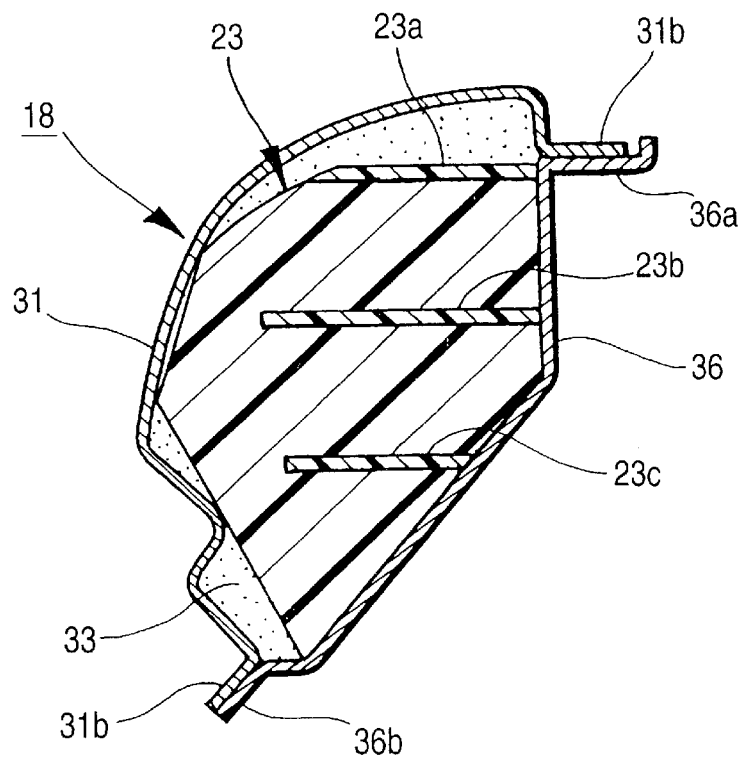
FIG. 4 is a cross-sectional view taken along the line IV—IV in FIG. 2.

FIG. 4 is a cross-sectional view taken along the line IV—IV in FIG. 2. The roof side portion 18 is a closed section structure including the outer panel 31 extending integrally from the center pillar 17 and a roof side rail 36 attached to the inside of the outer panel 31, in which the second reinforcement material 23 is interposed between the outer panel 31 and the roof side rail 36, and the filler 33 is filled in a space between the outer panel 31 and the roof side rail 36. Additionally, reference numerals 31$b$, 31$b$ denote flanges of the outer panel 31, and reference numerals 36$a$, 36$b$ denote flanges of the roof side rail 36 which are welded, respectively, to the flanges 31$b$, 31$b$.

The second reinforcement rib 23 has ribs. 23$a$, 23$b$, 23$c$.

Figure 5:
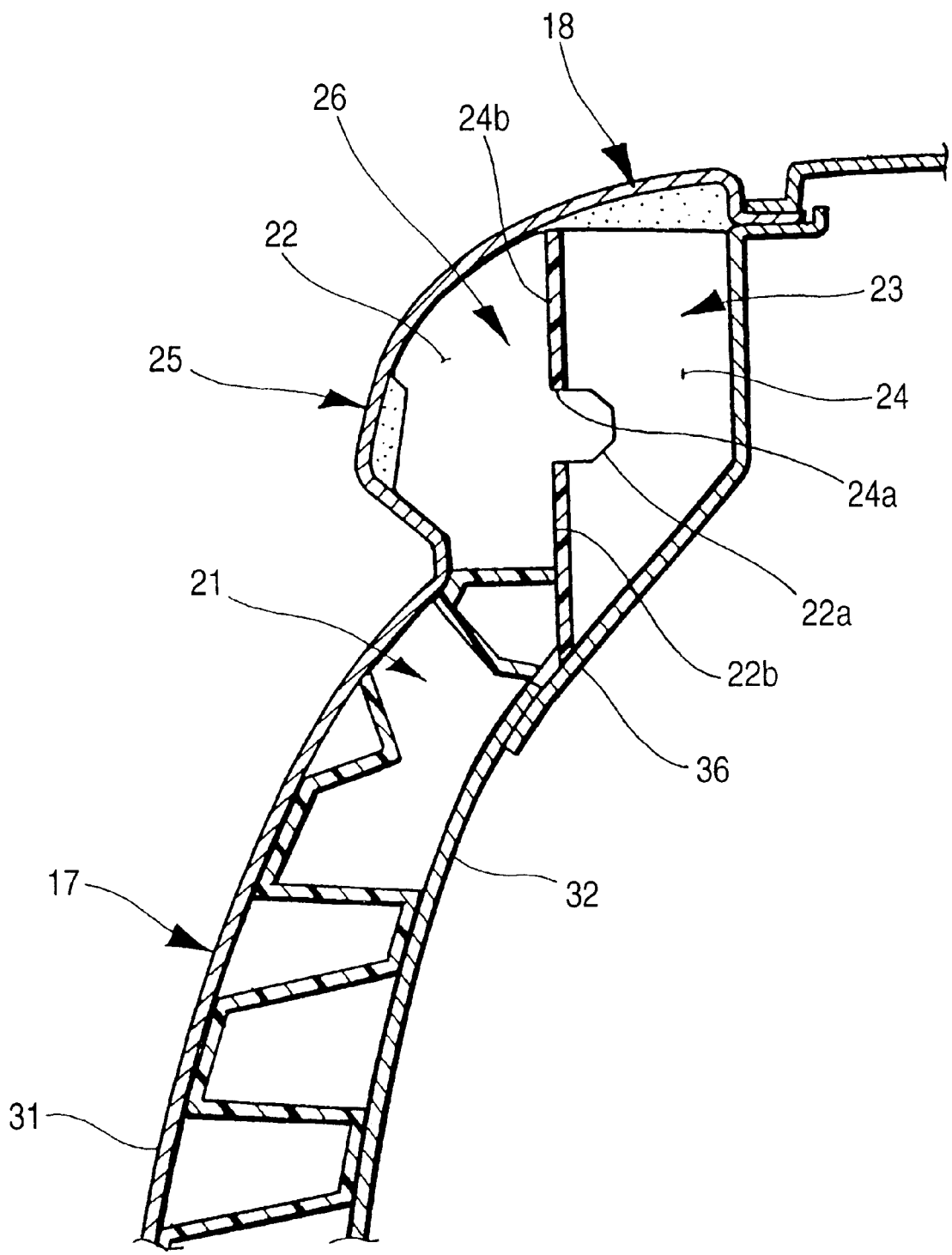
FIG. 5 is a cross-sectional view taken along the line V—V in FIG. 2.

FIG. 5 is a sectional view taken along the line V—V of FIG. 2 showing a state in which the first reinforcement material 21 and the second reinforcement material 23 are disposed within the connecting portion 25 of the center pillar 17 and the roof side portion 18.

A pillar side joint portion 22 of the first reinforcement material 21 includes a projecting portion 22$a$ projecting to the second reinforcement material 23 side. Note that reference numeral 22$b$ denotes a joint surface (an end face of a rib 22$d$ which will be described later) for jointing to the second reinforcement material 23.

The roof side joint portion 24 of the second reinforcement material 23 includes a positioning hole 24$a$ for positioning the roof side joint portion 24 at the pillar side joint portion 22 through the fitment of the projecting portion 22$a$ of the second reinforcement material 23 in the positioning hole 24$a$. Note that reference numeral 24$b$ denotes a joint surface of the second reinforcement material 23 for jointing to the first reinforcement material 21.

Figure 6:
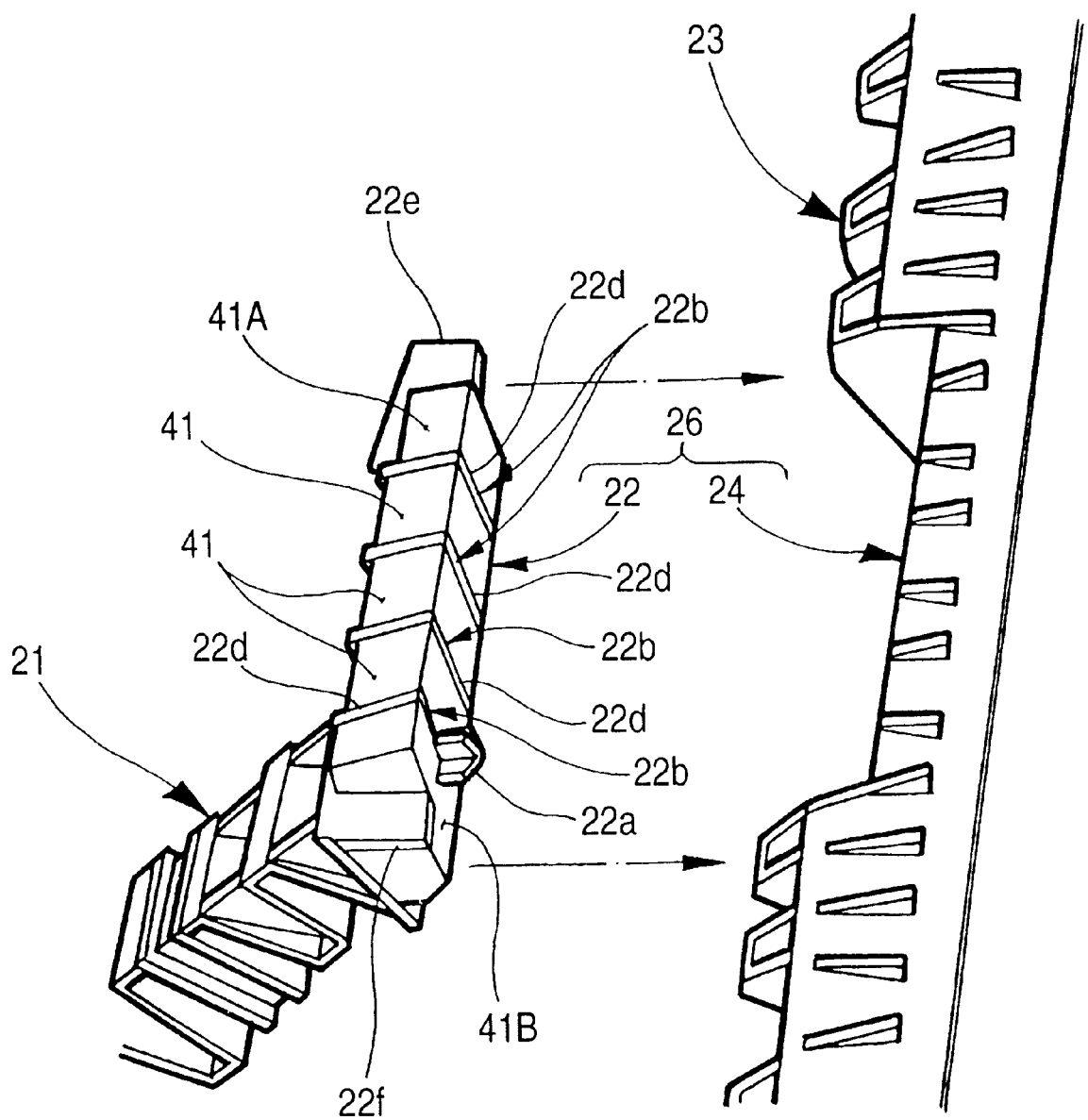
FIG. 6 is a first perspective view showing a main part of the vehicle body reinforcement structure (the first embodiment) of the invention.

FIG. 6 is a first perspective view showing a main part of the vehicle body reinforcement structure (the first embodiment) according to the invention and shows a state in which the pillar side joint portion 22 of the first reinforcement material 21 is jointed to the roof side joint portion 24 of the second reinforcement material 23.

The pillar side joint portion 22 is formed into a raised portion in which the projecting portion 22a is provided on the joint surface 22b.

The roof side joint portion 24 is formed into a recessed portion.

As has been described heretofore, the joint portion 26 according to the invention includes the pillar side joint portion 22, which is the raised portion of the first reinforcement material 21 and the roof side joint portion 24, which is the recessed portion of the second reinforcement material 23.

According to the above construction, the construction of the joint portion 26 is made simple by making up the same portion of the raised pillar side joint portion 22 and the recessed roof side joint portion 24, whereby the production of the first and second reinforcement materials 21, 23 can be facilitated, thereby making it possible to reduce the production cost thereof.

Figure 7:
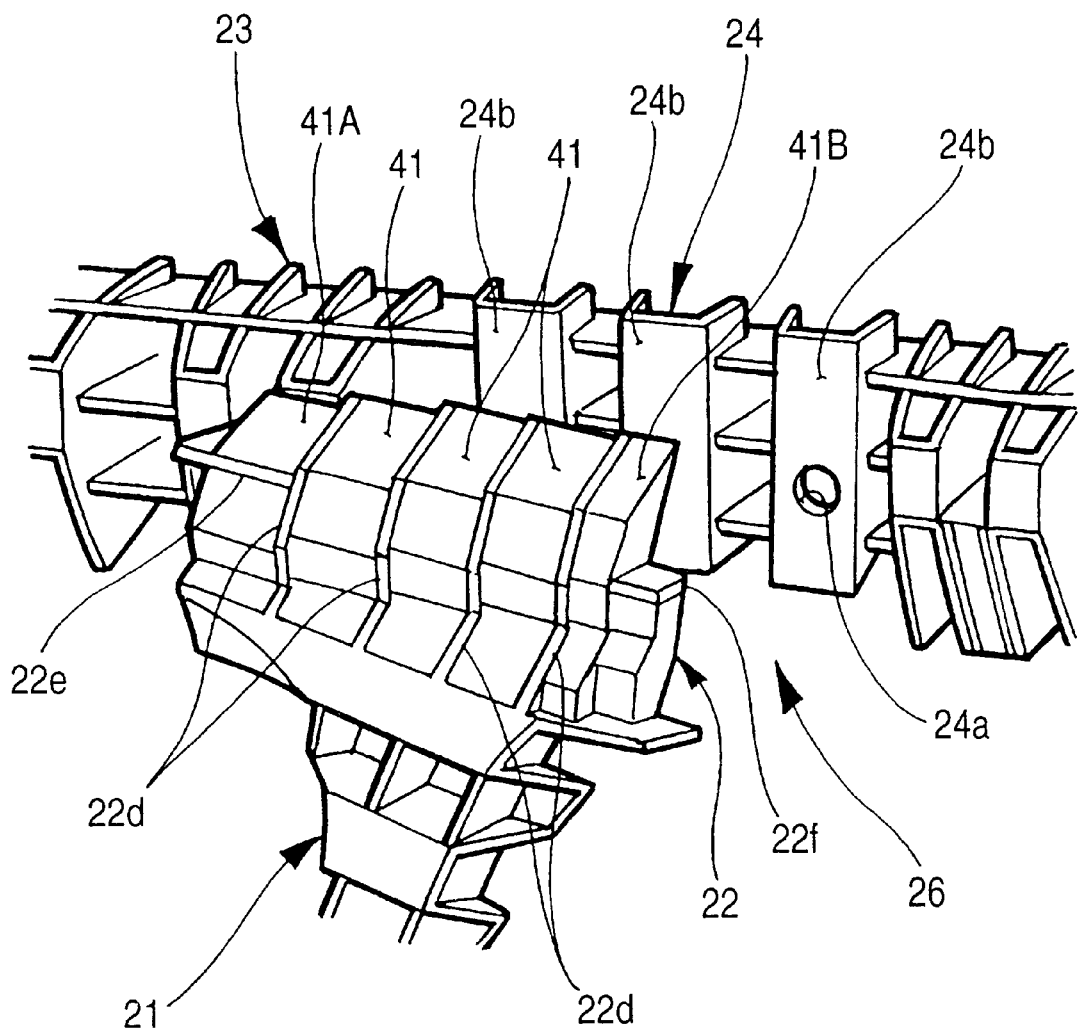
FIG. 7 is a second perspective view showing the main part of the vehicle body reinforcement structure (the first embodiment) of the invention.

FIG. 7 is a second perspective view showing the main part of the vehicle body reinforcement structure (the first embodiment) according to the invention and showing the state in which the pillar side joint portion 22 of the first reinforcement material 21 is joined to the roof side joint portion 24 of the second reinforcement material 23, as viewed from an angle which is different from that of FIG. 6.

The pillar side joint portion 22 includes the ribs 22d . . . , and a foamable resin 41 (including a resin in which a foam agent is mixed or dissolved) which has a foamable property is inserted between the adjacent ribs 22d, 22d. The pillar side joint portion 22 also includes ribs 22e, 22f, and foamable resins 41A, 41B which are similar to the foamable resin 41 are directly attached to the ribs 22e, 22f. The foamable resins 41, 41A, 41B are caused to expand, for example, at normal temperatures or by being heated from the outside thereof after the side bodies 12 (refer to FIG. 1) are constructed, to thereby fill the space around the joint portion 26 within the connecting portion 25 (refer to FIG. 5).

The roof side joint portion 24 is formed with a positioning hole 24a opened in the joint surface.

The foamable resins 41, 41A, 41B described above may be constructed such that they are inserted between the ribs 21a . . . , 21b . . . , 23a, 23b, 23c shown in FIGS. 3 and 4 or directly attached to those ribs and then caused to expand so as to fill the spaces within the front pillar 17 and the roof side portion 18 instead of using the filler 33.

The operation of the vehicle body reinforcement structure described heretofore will be described next.

Figure 8:
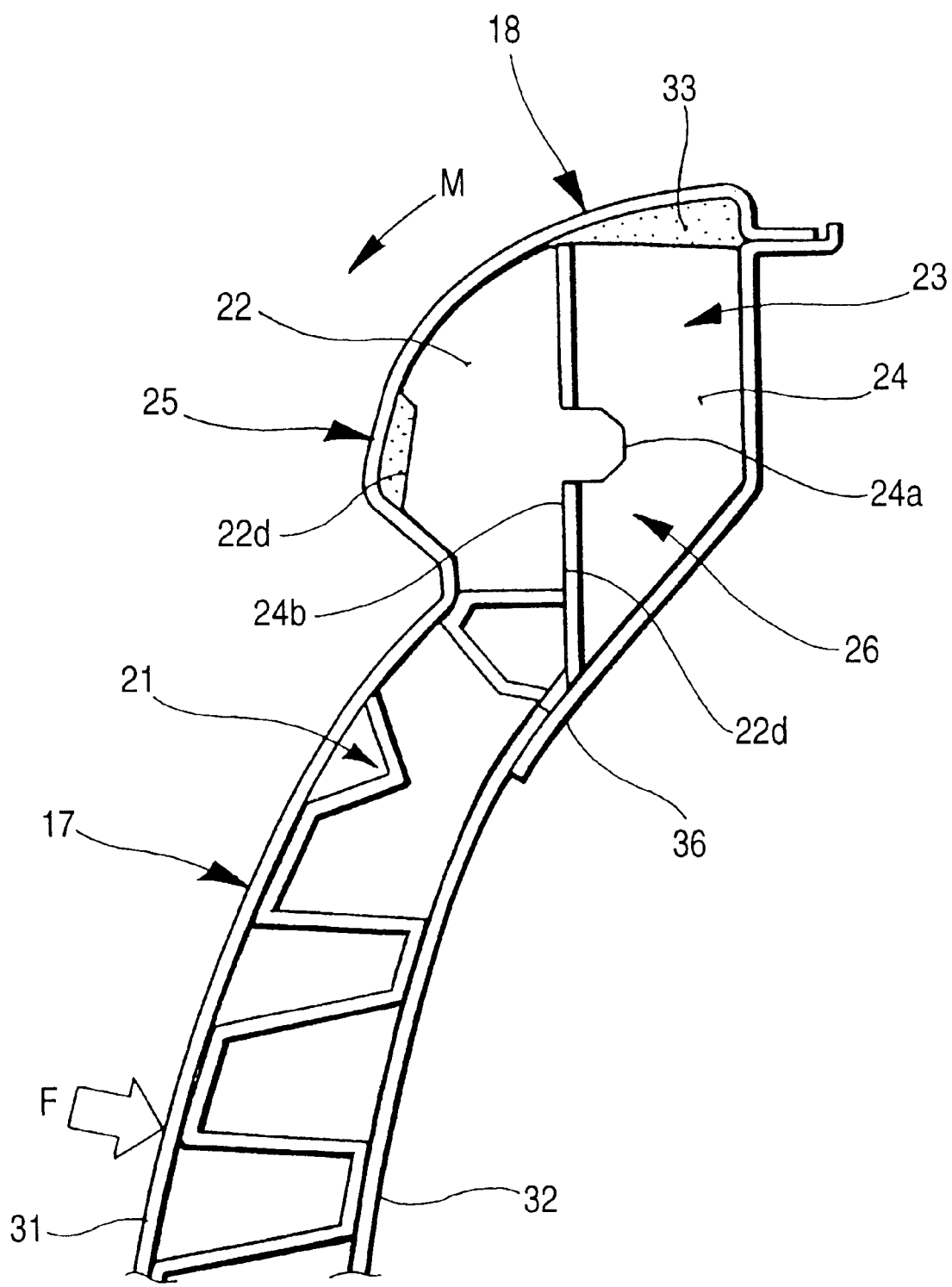
FIG. 8 is an explanatory diagram explaining the operation of the vehicle body reinforcement structure (the first embodiment) of the invention.

FIG. 8 is an operation diagram explaining the operation of the vehicle body reinforcement structure (the first embodiment) according to the invention.

When an external force F is applied to the center pillar 17 from the side thereof, the external force F acts to twist the roof side portion 18, and a torsion moment M is thereby applied to the roof side portion 18 in a direction designated by an arrow.

The interior of the connecting portion 25 becomes solid completely by jointing the pillar side joint portion 22 to the roof side joint portion 24, filling the space within the connecting portion 25 with the filler 33 and causing the foamable resins 41, 41A, 41B attached to the pillar side joint portion 22 to foam in the same space. The torsional rigidity of the connecting portion 25 is thereby increased remarkably. Thus, the connecting portion 25, in cooperation with the roof side portion 18 which is also made solid, can sufficiently bear the above torsion moment M, whereby the twisting of the connecting portion 25 and the entire roof side portion 18 can be suppressed, thereby making it possible to increase further the rigidity of the side body 12 (refer to FIG. 1).

As has been described in FIGS. 5 and 8, the present invention provides the vehicle body reinforcement structure for reinforcing the connecting portion 25 where closed section structures such as the center pillar 17, the roof side portion 18 and the like are connected to each other. The reinforcement structure includes the first reinforcement material 21 of hard resin disposed in the center pillar 17 which is one of the closed section structures, the second reinforcement material 23 of hard resin disposed in the roof side portion 18 which is the other closed section structure, and the joint portion 26 formed on the first and second reinforcement materials 21, 23 for directly jointing the first and second reinforcement materials 21, 23 together.

According to the above construction, welded portions that would result where sheet steel is used for reinforcement can be eliminated by jointing the first reinforcement material 21 of hard resin and the second reinforcement material of the similar hard resin together at the joint portion 26, whereby the working efficiency in reinforcing the connecting portion 25 of the closed section structures can be improved. Consequently, the productivity of the body 10 (refer to FIG. 1) can be improved.

In addition, since the first hard resin reinforcement material 21 is disposed in the center pillar 17, the second hard resin reinforcement material 23 is disposed in the roof side portion 18, and the first and second reinforcement materials 21, 23 are jointed together at the joint portion 26, the connecting portion 25 where the center pillar 17 and the roof side portion 18 are connected together, the center pillar 17 itself and the roof side portion 18 itself are all made solid, whereby the torsional rigidities thereof can be improved.

Consequently, the rigidity of the body can effectively be improved by improving the rigidity of the connecting portion 25 which best contributes to the improvement of the body rigidity.

Additionally, as is described in FIGS. 5 and 7, according to the invention, the pillar side joint portion 22 constituting the joint portion 26 includes the ribs 21d, 21e, 21f. The foamable resin 41 which has the foamable property is inserted between the adjacent ribs 21d, 21d. And the foamable resins 41A, 41B are directly attached to the ribs 21e, 21f, respectively.

According to the above construction, the space inside the connecting portion 25 of the center pillar 17 and the roof side portion 18 can be filled by causing the foamable resins 41, 41A, 41B to foam, whereby the first reinforcement material 21 and the second reinforcement material 23 can be jointed together strongly, thereby making it possible to increase further the rigidity of the joint portion 26 of the first and second reinforcement materials 21, 23. This can increase the rigidity of the side bodies 12, as well as the body 10.

Figure 9A:
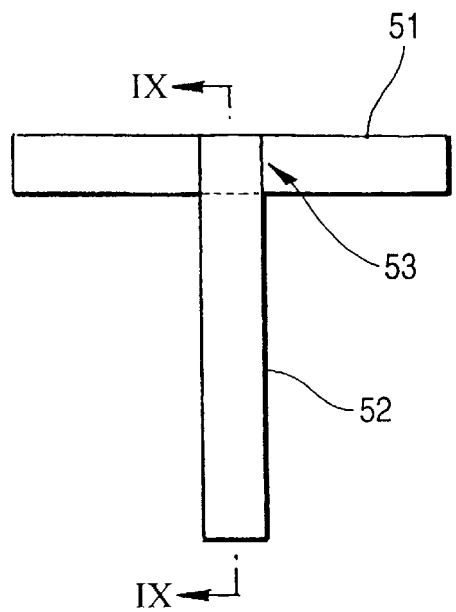
FIGS. 9A and 9B are diagrams showing a typical example of another vehicle body reinforcement structure (a second embodiment) according to the invention.
Figure 9B:
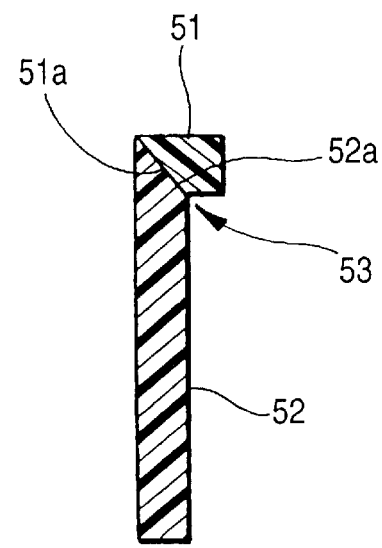

FIGS. 9A, 9B show a typical example of another vehicle body reinforcement structure (a second embodiment) according to the invention.

FIG. 9A shows a state in which a first reinforcement material 51 of hard resin and a second reinforcement material 52 of hard resin are jointed together in a T-shaped fashion.

FIG. 9B is a sectional view taken along the line IX—IX in FIG. 9A. The first and second reinforcement materials 51, 52 have inclined surfaces 51a, 52a formed at end portions of thereof, respectively, and are jointed together by jointing the inclined surface 51a to the incline surface 52a.

A joint portion 53 is constituted by these inclined surfaces 51a, 52a.

As with the first embodiment, the circumference of the joint portion 53 is filled with foamable resins or a filler which is caused to expand in closed section structures of the body, whereby the rigidity at the joint portion 53 is improved so as to realize a highly rigid body.

Figure 10A:
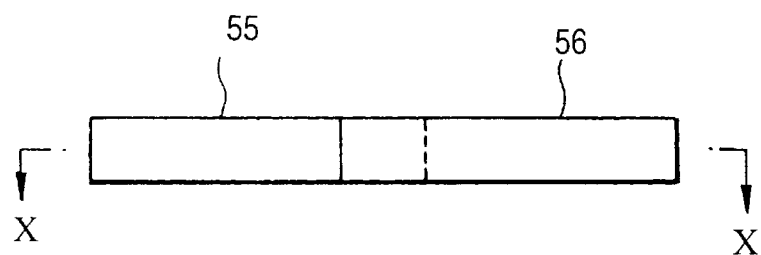
FIGS. 10A to 10C are diagrams showing a typical example of the other vehicle body reinforcement structure (a third embodiment) according to the invention.
Figure 10B:
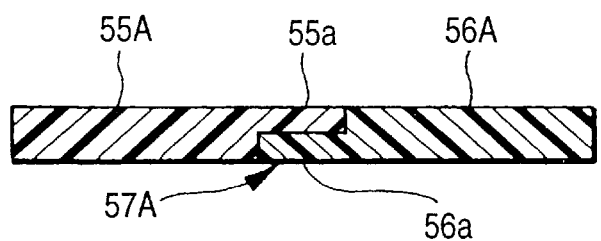
Figure 10C:
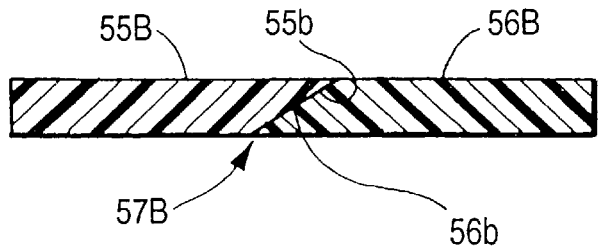
Figure 11A:
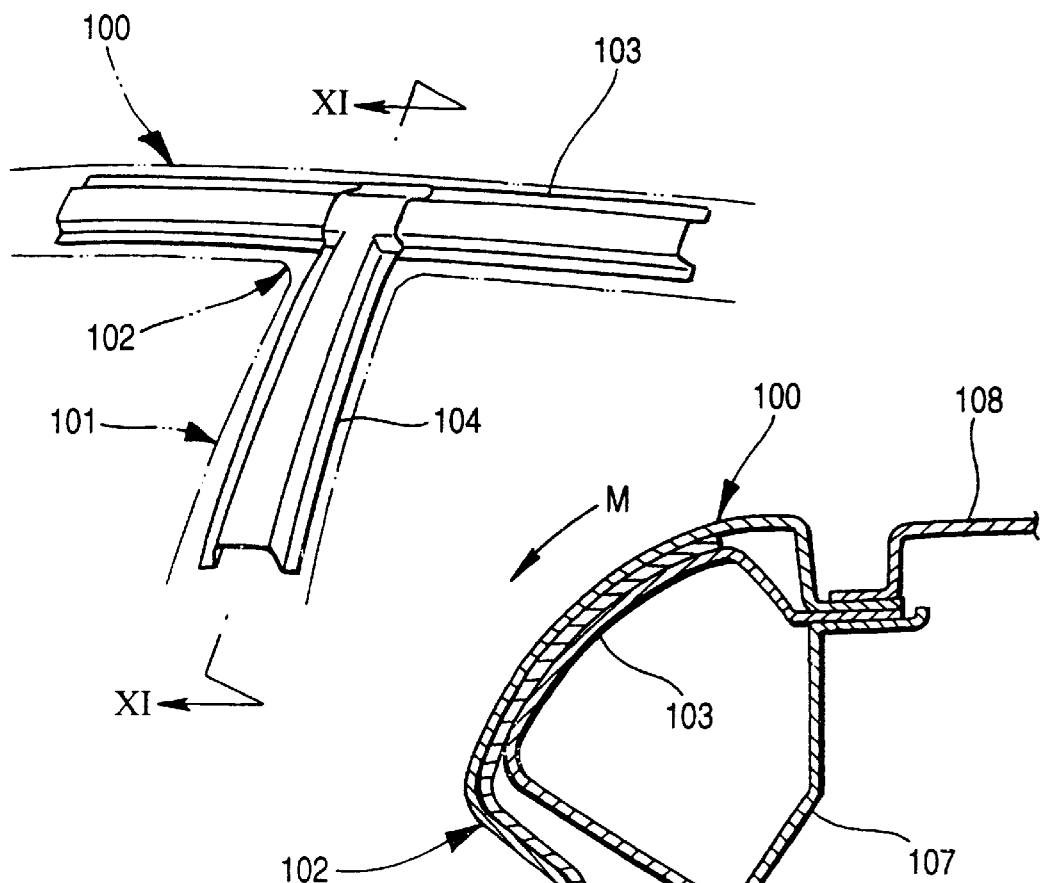
FIGS. 11A and 11B are perspective views showing a state in which a reinforced connecting portion of a conventional vehicle body.
Figure 11B:
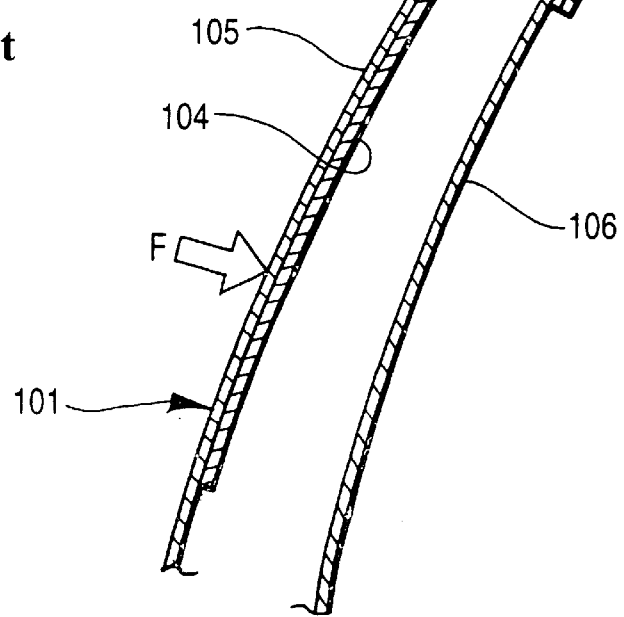
Figure 12A:
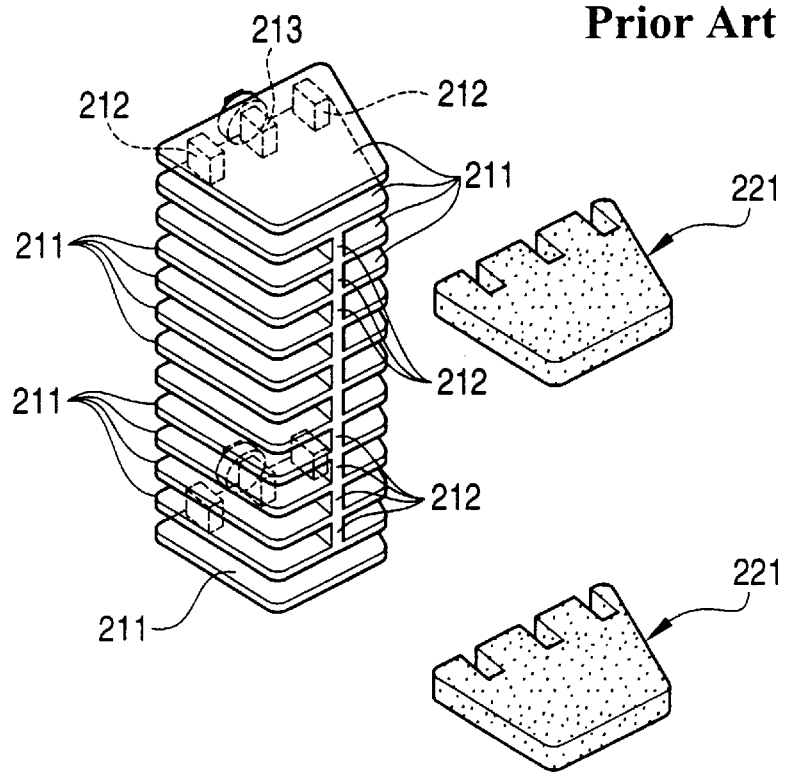
FIGS. 12A and 12B are views showing a reinforcement structure of another conventional vehicle body.
Figure 12B:
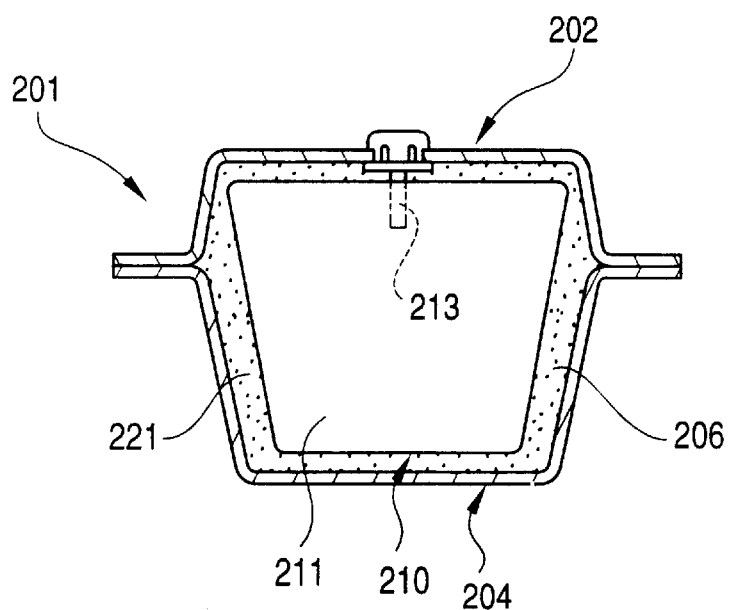

FIGS. 10A to 10C show a typical example of the other vehicle body reinforcement structure (a third embodiment) according to the invention.

FIG. 10A shows a state in which a first reinforcement material 55 of hard resin and a second reinforcement material 56 of hard resin are connected together in a linear fashion.

FIG. 10B is a sectional view taken along the line X—X in FIG. 10A. First and second reinforcement materials 55A, 56A (the first and second reinforcement materials 55A, 56A are the same as the first and second reinforcement materials 55, 56, respectively, but for the sake of explanation, A is affixed to the end of each reference numeral) have thinned portions 55a, 56a formed at end portions thereof, respectively, and are jointed together by jointing the thinned portion 55a and the thinned portion 56a together.

The thinned portions 55a, 56a constitute a joint portion 57A.

FIG. 10C is a sectional view showing a modification to the embodiment shown in FIG. 10B and which corresponds to the sectional view taken along the line X—X in FIG. 10A.

First and second reinforcement materials 55B, 56B (the first and second reinforcement materials 55B, 56B are the same as the first and second reinforcement materials 55, 56, respectively, but for the sake of explanation, B is affixed to the end of each reference numeral) have inclined surfaces 55b, 56b formed at end portions thereof, respectively, and are jointed together by jointing the inclined surfaces 55b and the inclined surface 56b together.

The inclined surfaces 55b, 56b constitute a joint portion 57B.

As with the first embodiment, the circumferences of the joint portions 57A, 57B which are described in FIGS. 10B, 10C are filled with foamable resins or a filler which is caused to foam in closed section structures of the body, whereby the rigidities at the joint portions 57A, 57B are improved so as to realize a highly rigid body.

Note that the joint surfaces 22b, 24b show in FIG. 5, the inclined surfaces 51a, 52a shown in FIG. 9B, the joint surface of the thinned portions 55a, 56a shown in FIG. 10B and the inclined surfaces 55b, 56b shown in FIG. 10C may be joined together through bonding, welding or the like.

In addition, in FIG. 7, while the foamable resins 41, 41A, 41B are directly attached to the ribs inserted between the ribs in the pillar side joint portion 22, the invention is not limited to that construction. The foamable resins 41, 41A, 41B may be directly attached to the ribs or inserted between the ribs in the roof side joint portion 24 only, or they may be directly attached to the ribs or inserted between the ribs in both the pillar side joint portion 22 and the roof side joint portion 24.

While only certain embodiments of the invention have been specifically described herein, it will apparent that numerous modifications may be made thereto, without departing from the spirit and scope of the invention.

According to the aforesaid constructions; the invention provides the following advantages.

According to the vehicle body reinforcement structure as set forth in the first aspect of the invention, since the structure comprises the first reinforcement material of hard resin disposed in one of the closed section structures, the second reinforcement material of hard resin disposed in the other closed section structure and the joint portion formed on the first and second reinforcement materials for jointing directly the first and second reinforcement materials, welded portions that would result where sheet steel is used for reinforcement can be eliminated by jointing the first reinforcement material of hard resin and the second reinforcement material of the same hard resin, thereby making it possible to improve the working efficiency in reinforcing the connecting portion where the closed section structures are connected to each other. Consequently, the productivity of bodies can be increased.

In addition, since the first reinforcement material of hard resin is disposed in one of the closed section structures, the second reinforcement material of hard resin is disposed in the other closed section structure, and the first and second reinforcement materials are jointed together at the joint portion, the connecting portion of the closed section structures and the closed section structures themselves become solid, whereby the torsional rigidities thereof can be increased.

Consequently, the body rigidity can effectively be increased by increasing the rigidity of the connecting portion of the closed section structures which best contributes to the improvement of the body rigidity.

According to the vehicle body reinforcement structure as set forth in the second aspect of the invention, since the joint portion consists of the raised portion formed on the first reinforcement material and the recessed portion formed in the second reinforcement material, the construction of the joint portion can be simplified, whereby the first and second reinforcement materials can be easily produced, this helping reduce the production cost.

According to the vehicle body reinforcement structure as set forth in the third aspect of the invention, since the joint portion consists of the plurality of ribs with the foamable resins being inserted between the adjacent ribs, the space in the connecting portion of the closed section structures can be filled by causing the resins to expand, whereby the first reinforcement material and the second reinforcement material can be jointed together strongly and the rigidity of the joint portion of the first and second reinforcement materials can be thereby further increased. Thus, the body rigidity can further be increased.

What is claimed is:

1. A vehicle body reinforcement structure for reinforcing a connecting portion where first and second closed section structures are connected to each other, said reinforcement structure comprising:

a first reinforcement material of hard resin disposed in said first closed section structure;

a second reinforcement material of hard resin disposed in said second closed section structure; and a joint portion formed on said first and second reinforcement materials for directly jointing said first and second reinforcement materials together.

2. The vehicle body reinforcement structure as set forth in claim 1, wherein said joint portion comprises a raised portion formed on said first reinforcement material and a recessed portion formed in said second reinforcement material.

3. The vehicle body reinforcement structure as set forth in claim 1, wherein said joint portion comprises a plurality of ribs with a foamable resin inserted between said ribs which are adjacent to each other.

4. The vehicle body reinforcement structure as set forth in claim 1, wherein at least one of said first and second closed section structures is a pillar.

5. The vehicle body reinforcement structure as set forth in claim 1, wherein at least one of said first and second closed section structures is a roof side portion.

6. The vehicle body reinforcement structure as set forth in claim 1, wherein a space at said connecting portion in which said first and second reinforcement materials are located, is filled with at least one of a filler and a foamable resin such that said connecting portion forms a solid state.

7. The vehicle body reinforcement structure as set forth in claim 6, wherein said first and second reinforcement materials are positioned in said connecting portion by filling said at least one of the filler and the foamable resin into the space between said first and second closed section structures.

* * * * *